G. LIDSEEN.
MOTOR.
APPLICATION FILED JULY 3, 1917.
1,367,982.
Patented Feb. 8, 1921.
2 SHEETS—SHEET 2.
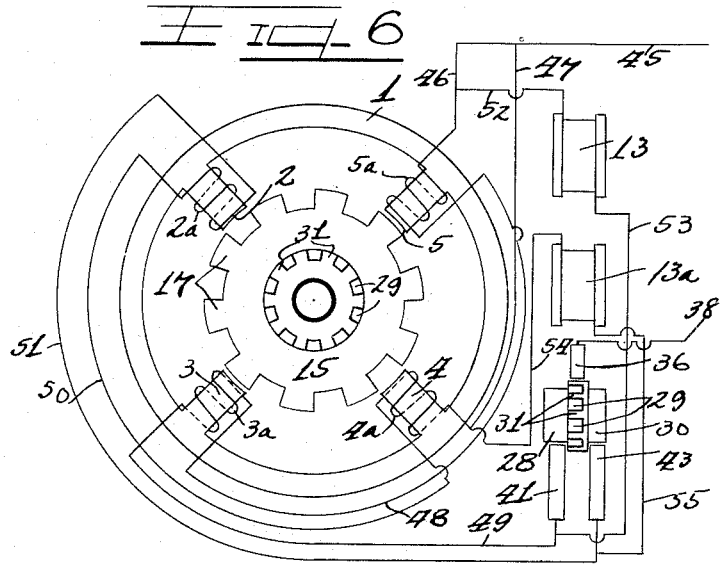
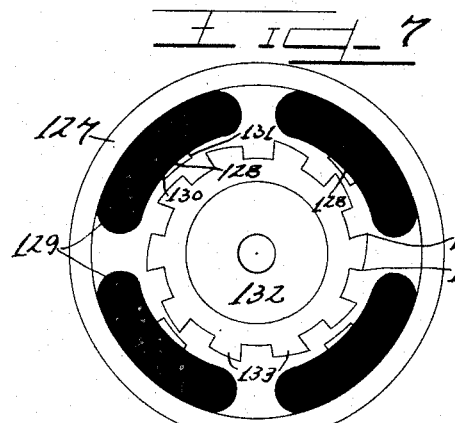
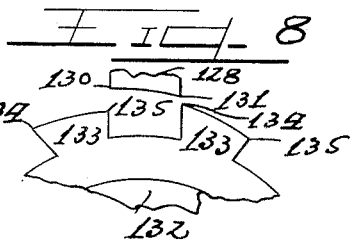
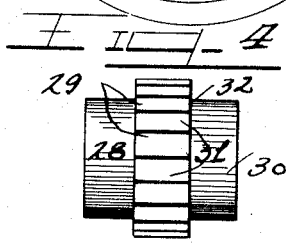
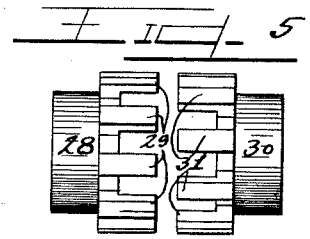
Witnesses
Inventor
Gustave Lidseen

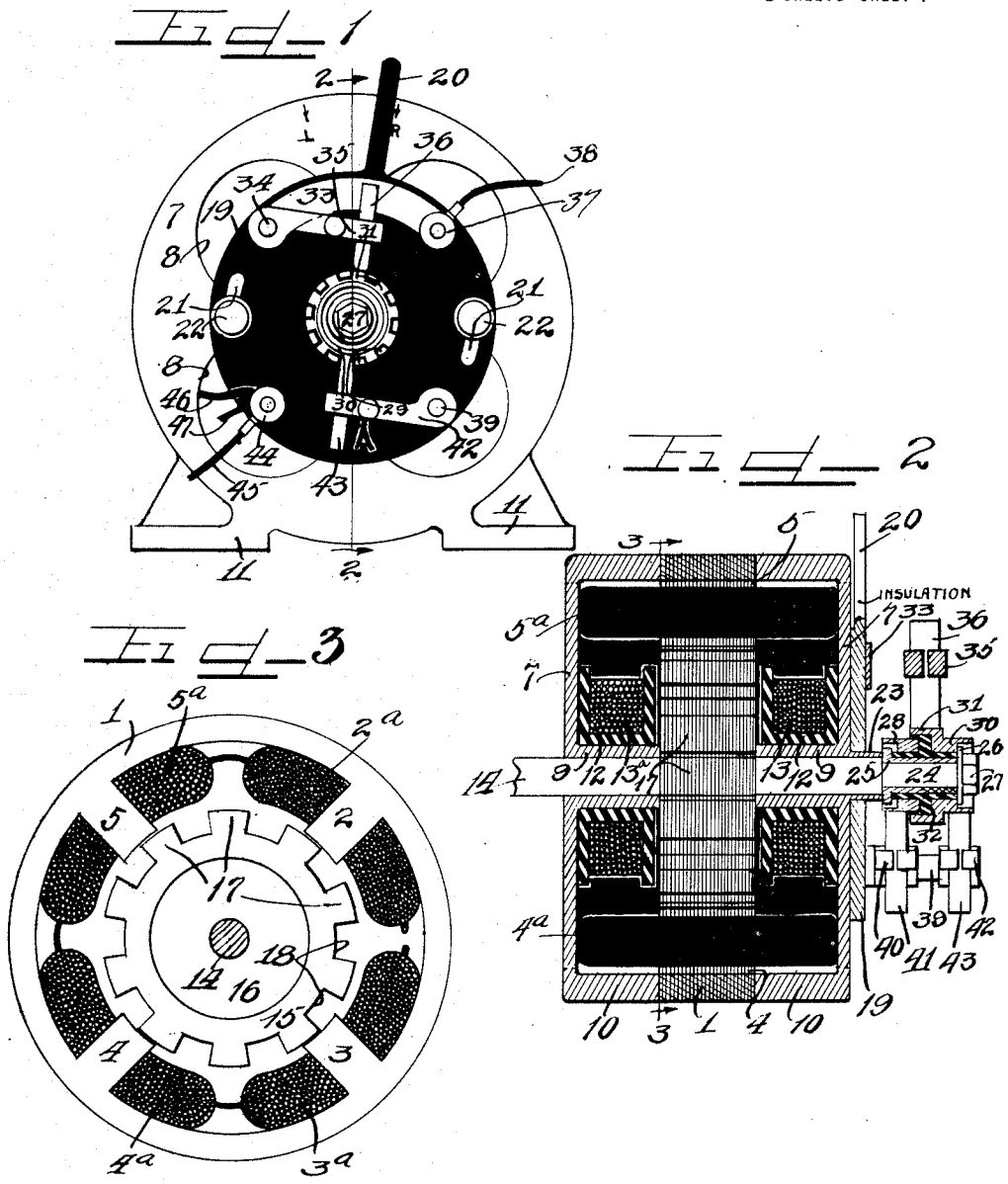

UNITED STATES PATENT OFFICE.

GUSTAVE LIDSEEN, OF CHICAGO, ILLINOIS.

MOTOR.

1,367,982.   Specification of Letters Patent.   Patented Feb. 8, 1921.

Application filed July 3, 1917. Serial No. 178,461.

*To all whom it may concern:*

Be it known that I, GUSTAVE LIDSEEN, a citizen of the United States, and a resident of the city of Chicago, in the county of Cook and State of Illinois, have invented certain new and useful Improvements in Motors; and I do hereby declare that the following is a full, clear, and exact description of the same, reference being had to the accompanying drawings, and to the numerals of reference marked thereon, which form a part of this specification.

This invention relates to an improved form of motor adapted to be energized by either a direct or alternating current and comprises a toothed armature without windings rotatable in a multipolar yoke the number of pole pieces of which bear a certain set relation to the number of armature teeth to afford an arrangement wherein one set of armature teeth are disposed in a position to be attracted by the magnetization of certain of the pole pieces when another set of armature teeth is being released by the demagnetization of other pole pieces due to alternately magnetizing and demagnetizing the various sets of pole pieces.

It is an object of this invention to construct a universal motor, the armature of which is without windings and has the teeth thereof bearing a certain relation to the number of electromagnets to permit the armature to be rotated by alternately magnetizing alternate sets of the electromagnets.

It is also an object of the invention to construct a motor wherein the teeth of an armature bear a certain relation to the number of pole pieces to permit rotation of the armature by alternately energizing alternate sets of the pole pieces, and in which sparking at the commutator is obviated by connecting resistances in the circuit of the motor.

It is a further object of this invention to provide a laminated armature which may have a non-magnetic core and in which said armature is journaled in a laminated pole piece yoke wherein the pole pieces are provided with windings certain pairs of which are alternately energized to cause rotation of the armature due to the peculiar construction of the pole pieces and the armature teeth and also to the arrangement of the number of pole pieces to the number of teeth on the armature.

It is furthermore an object of this invention to construct a motor wherein an armature without windings is disposed between sets of electromagnets having a common yoke, the number of armature teeth bearing a certain relation to the number of electromagnets to permit the armature to be rotated by alternately energizing the sets of electromagnets, each set of which is provided with a brush adapted to contact opposite ends of a double commutator to permit a return of the circuit through a common line brush, sparking between said brushes and the commutator being obviated by the connection of resistances in the line circuit across the brushes or in parallel with the sets of electromagnets.

It is an important object of this invention to construct a universal motor simple and of effective construction wherein an armature without a winding is rotated by electromagnets which are alternately energized and so spaced with respect to the teeth of the armature that when certain of the electromagnets become demagnetized, the others are magnetized to attract certain of the armature teeth which have been moved into a suitable position for the purpose due to the relation of the number of said teeth with respect to the number of electromagnets.

Other and further objects of this invention will be apparent from the disclosures in the claim and specification.

The invention (in a preferred form) is illustrated in the drawings and hereinafter more fully described.

On the drawings:

Figure 1 is a plan view of the front end of a motor embracing the principles of this invention.

Fig. 2 is a section taken on line 2—2, of Fig. 1, with parts shown in elevation and with parts omitted.

Fig. 3 is a section taken on line 3—3, of Fig. 2.

Fig. 4 is an enlarged top plan view of the commutator as an assembled unit.

Fig. 5 is a detailed elevational view of the commutator sections separated from one another, with the insulation omitted.

Fig. 6 is a wiring diagram of the device.

Fig. 7 is a view similar to that shown in Fig. 3, of a modified form of the device, showing the field coils in elevation.

Fig. 8 is a fragmentary detail view of a portion of the armature and the end of one of the pole pieces thereof showing the peculiar construction of the armature teeth and the end of the pole pieces.

As shown on the drawings:

The reference 1, indicates a laminated field magnet yoke having a plurality of oppositely disposed laminated field magnet cores or pole pieces 2, 3, 4 and 5, respectively, integrally formed thereon and directed radially inwardly, to permit a field coil or winding $2^a$, $3^a$, $4^a$ and $5^a$, to be mounted on the respective pole pieces 2, 3, 4 and 5, in any suitable manner, with the oppositely disposed field coils connected in series with one another. Rigidly secured by screws or other suitable means on opposite sides of the laminated yoke 1, is a front and a rear cap or casing each constructed exactly alike and comprising an end plate 7, having a plurality of ventilating apertures or openings 8, therein, and provided centrally on the inner face thereof with an integral sleeve or collar 9, disposed at right angles to the plate. Also integrally formed on the outer periphery of each end plate 7, is an inwardly directed rim or flange 10, disposed at right angles to said plate and adapted to have the inner end abut the yoke 1, as clearly shown in Fig. 2, thus affording a casing inclosing the field coils. To hold the device properly supported upon a floor or foundation each of the flanges 10, has integrally formed on opposite sides of the lower portion thereof a leg or foot 11, adapted to be provided with suitable drillings for the purpose of receiving retaining bolts to hold the device in position. Mounted upon each of the sleeves 9, or in any other suitable position, is a reel 12, made of any suitable kind of insulating material and wound on one of the reel shafts between the sides of the reel is a resistance coil 13, and on the other reel shaft a resistance $13^a$, of fine insulated wire adapted to prevent brush sparking as hereinafter described.

Rotatably journaled in the sleeves 9, and projecting through the ends of the motor casing is an armature shaft 14, having rigidly secured centrally thereon by means of a key, or other means, a laminated iron armature 15, which may have a non-magnetic metal core 16, disposed between the armature and said shaft if desired. The armature is disposed within the motor casing to rotate between the ends of the pole pieces 2, 3, 4 and 5, and has integrally formed on the outer periphery thereof a plurality of equidistantly spaced laminated armature teeth 17, ten of which are shown. The number of armature teeth, however, may be varied so long as a suitable relation to the number of pole pieces is maintained to permit two oppositely disposed armature teeth to be alined or positioned adjacent two of the pole pieces when two oppositely disposed armature spaces 18, between the armature teeth, are positioned adjacent to or in alinement with the ends of the other two pole pieces.

Adjustably or rotatably mounted on a hub or collar 23, integrally formed centrally on the outer surface of the front plate 7, is a large insulating disk or plate 19, having a handle 20, integrally formed thereon for actuating the same, and provided with a pair of oppositely disposed curved slots 21, adapted to receive locking screws 22, projecting therethrough and into the front plate 7, to hold said insulating disk locked in an adjusted position. The end of the shaft 14, beyond the end of the collar 23, is of reduced diameter to afford an axle spindle 24, upon which is keyed a flanged commutator sleeve 25, which is prevented from slipping off of the axle spindle by means of a washer 26, and a nut 27, engaged on the threaded outer end of the axle spindle. A double commutator is rigidly secured upon the sleeve 25, and comprises an inner commutator section embracing a drum or hub 28, on which is integrally formed upwardly and outwardly directed parallel commutator bars 29, spaced equally from one another. The outer commutator section, forming the other half of the double commutator, comprises a drum or hub 30, on which are integrally formed upwardly and inwardly directed parallel commutator bars 31, also equally spaced apart to permit the same to fit between the commutator bars 29. The interfitting commutator bars 29 and 31, and the respective hubs 28 and 30, thereof, are insulated from each other and from the commutator sleeve 25, by insulating material 32, which also serves to rigidly connect the inner and outer commutator sections and the sleeve 25, together to form the double commutator unit, which is adapted to rotate with the shaft 14, and the motor armature.

Rigidly secured upon the outer face of the insulating disk 19, and near the upper end thereof is a curved or arc shaped metal conductor strip 33, on one end of which is rigidly secured at right angles thereto a stub shaft 34, on the outer end of which is rotatably mounted the inner end of a spring controlled split brush arm 35, adapted to rigidly clamp a line brush 36, in the outer end thereof in an adjusted position to permit the lower or inner end of said line brush 36, to adjustably contact the commutator bars 29 and 31. Connected to the other end of the conductor strip 33, by a line connector 37, is one end of an electric supply line 38, the other end of which is connected to a suitable source of power. Rigidly secured at right angles to the insulating disk 19, and diametrically opposite the stub shaft 34, is a longer stub shaft 39, upon which is rotatably mounted an inner spring controlled split brush arm 40, adapted to rigidly clamp an inner pole brush 41, in an adjusted position with the inner end thereof adjustably contacting the inner commutator hub 28. Also rotatably secured on the outer end of the stub shaft 39, is an outer spring controlled split brush arm 42, adapted to rigidly clamp an outer pole brush 43, in an adjusted position with the inner end thereof adjustably contacting the outer commutator hub 30. Secured upon the insulating disk 19, diametrically opposite the connector 37, is a line connector 44, to which one end of an electric supply line 45, is connected, the other end of the supply line 45, being connected to the source of power. Also connected to the connector 44, are the outer ends of two wires 46 and 47, respectively. The inner end of the wire 46, is connected to one terminal of the field coil 5$^a$, while the inner end of the wire 47, is connected with one terminal of the field coil 4$^a$. The other terminal of the field coil 5$^a$, is connected by a wire 48, to one terminal of the field coil 3$^a$, and the other terminal of the field coil 3$^a$, is connected to the inner pole brush 41, by means of a wire 49. The second terminal of the field coil 4$^a$, is connected to one terminal of the field coil 2$^a$, by a wire 50, the other terminal of said field coil 2$^a$, being connected by means of a wire 51, to the outer pole brush 43. As shown in Fig. 6, one terminal wire 52, of the resistance 13, is connected to the wire 46, while the other terminal wire 53, is connected to the pole brush 41. The other resistance coil 13$^a$, has one terminal wire 54, connected to the wire 47, and the other terminal wire 55, connected to the outer pole brush 43. The resistances 13 and 13$^a$, are connected in parallel with the field coils, and are adapted to obviate sparking between the brushes and the commutator.

Figs. 7 and 8, illustrate a modified form of the device disclosing peculiarly shaped field poles and armature teeth, which may be used on any of the various forms of the device hereinbefore described, if so desired. The reference numeral 127, indicates a pole yoke having integrally formed or rigidly secured therein a plurality of inwardly directed pole pieces 128, on each of which is mounted a field coil 129. Each of the pole pieces 128, is formed or shaped at the inner end with the leading pole tip 130, shorter than the trailing pole tip 131. Rotatably mounted within the yoke 127, between the pole pieces 128, is an armature 132, provided with a plurality of armature teeth 133, the leading tips 134, of which are longer than the trailing tips 135 which construction affords a varying gap between the ends of the armature teeth and the inner ends of the pole pieces as the armature rotates, due to the fact that the gap between the leading tips 134, of the teeth and the trailing tips 131, of the poles is shorter than the gap between the trailing tips 135, of the teeth and the leading tips 130, of the poles, as clearly shown in Fig. 8.

The operation is as follows:

The motor is adapted to be run on either a direct or alternating current. When the line circuit is closed by means of any suitable type of switch connected therein, the current, as indicated by the wiring diagram of Fig. 6, is conducted through the main line 45, the wire 47, through the coil 4$^a$, the wire 50 and the coil 2$^a$, then through the wire 51, to the outer pole brush 43, through the drum 30, the commutator bars 31, to the line brush 36, and out through the return main line 38, completing the circuit. The coils 2$^a$ and 4$^a$, thus magnetize the pole pieces 2 and 4, forming electromagnets which attract the respective teeth 17, the forward edges of which are positioned adjacent the trailing tips of the respective pole pieces 2 and 4, thus causing the armature and the commutator to rotate moving the teeth 17, alined with the pole pieces 3 and 5, forwardly to position two other teeth in position to be attracted by the electromagnets formed by the field coils 3$^a$ and 5$^a$, which are energized by the current flowing from the line 45, through the wire 46, the coils 5$^a$ and 3$^a$, the wire 49, through the inner pole brush 41, the drum 28, the commutator bars 29, one of which has been moved into contact with the line brush 36, from which point the circuit is completed through the line 38. The above operations are continuously repeated by alternately establishing the circuit first through one set of electromagnets and then through the other set, the line brush 36, completing the circuits alternately through the commutator bars 29 and 31, and the respective pole brushes 41 and 43, which contact the commutator drums 28 and 30, respectively. Sparking at the commutator is obviated by means of the fine wire resistance coils 13 and 13$^a$, which are connected in parallel with the field coils, the resistance 13, being connected in the circuit of the pole brush 41, while the resistance 13$^a$, is connected in the circuit of the pole brush 43. Due to the laminated construction of the pole yoke, the pole pieces, and the armature, eddy currents are minimized, which together with the ventilating apertures 8, in the motor casing plates 7, tend to prevent excessive heating of the motor.

It will of course be understood that the number of armature teeth and the number of pole pieces may be varied, to afford motors of different speeds, so long as a certain relation between the number of armature teeth and the number of pole pieces is maintained to permit certain of the armature teeth to be moved into a position to permit attraction thereof by certain of the magnetized pole pieces, when other pole pieces have completed an operation and are demagnetized. It will also be noted that the line brush on the double commutator unit is adapted to alternately contact first one of the commutator bars of one section of the commutator and then one on the other section, thus providing a means for alternately energizing the different groups of field coils. The rotatably mounted brush carrying insulating disks may be shifted back and forth a certain distance to reverse the motor due to the change in the position of the brushes relative to the armature teeth. It will of course be understood that pole pieces and armature teeth shaped as shown in Figs. 7 and 8, may be used in any of the various types of motors shown, if so desired. This construction permits the longer or trailing tips of magnetized pole pieces to exert a strong pull upon the longer or leading tips of armature teeth positioned to be attracted, and also permits other teeth to be readily released by other pole pieces which are demagnetized on account of the shifting of the line circuit, due to the increased size of the gaps between the leading tips of the pole pieces and the shorter or trailing tips of the armature teeth.

I claim as my invention:

In an electric motor of the class described, a casing, electromagnets in the casing, a central longitudinal sleeve integral with the casing, a shaft rotatable in the sleeve, a commutator on the shaft for alternately energizing the electromagnets, an armature on the shaft, a reel mounted on the sleeve opposite each end of the armature, and a resistance on each reel in parallel with the winding on the electromagnets to prevent sparking at the commutator.

In testimony whereof I have hereunto subscribed my name in the presence of two subscribing witnesses.

GUSTAVE LIDSEEN.

Witnesses:
CHARLES W. HILLS, Jr.,
EARL M. HARDINE.